US 6,866,736 B2

(12) United States Patent
Wright

(10) Patent No.: US 6,866,736 B2
(45) Date of Patent: Mar. 15, 2005

(54) COMBINED TRANSFER OF TOE GUARDS AND INNER LINER FROM FALSE DRUM TO BUILDING DRUM

(75) Inventor: Anthony Richard Wright, Warken (LU)

(73) Assignee: The Goodyear Tire & Rubber Company, Akron, OH (US)

(*) Notice: Subject to any disclaimer, the term of this patent is extended or adjusted under 35 U.S.C. 154(b) by 278 days.

(21) Appl. No.: 09/957,754

(22) Filed: Sep. 21, 2001

(65) Prior Publication Data

US 2003/0056875 A1 Mar. 27, 2003

(51) Int. Cl.[7] .............................................. B29D 30/30
(52) U.S. Cl. ..................... 156/123; 156/133; 156/406.4
(58) Field of Search ............................. 156/123, 130.7, 156/133, 134, 135, 406.4, 405.1, 406.2; 198/471.1, 470.1, 472.1, 867.01–803.16

(56) References Cited

U.S. PATENT DOCUMENTS 4,276,104 A  *  6/1981  Riggs ........................ 156/133
4,722,255 A     2/1988  Choate et al.
5,004,635 A  *  4/1991  Griebling .................... 428/33
5,820,726 A    10/1998  Yoshida et al.

FOREIGN PATENT DOCUMENTS

GB          1010597         11/1965
JP      2001301057 A   *   10/2001

* cited by examiner

Primary Examiner—Geoffrey L. Knable
(74) Attorney, Agent, or Firm—Howard M. Cohn

(57) ABSTRACT

At least first and second dissimilar tire components are placed on a false drum, and are subsequently transferred, en masse, to a building drum, in the following manner. The first tire component is placed on the false drum with the false drum stationary, using a vacuum device to pick up a free end of the first tire component and place it on the false drum. The vacuum in the false drum is turned on to grasp the first tire component, and the vacuum device is turned off to release the first tire component. A free end of the second tire component, previously picked up using a pickup device, is placed on the false drum. The step of placing the free end of the second tire component onto the false drum may be performed after the drum has been rotated slightly. The false drum is rotated to measure out the first and second tire components, and they are cut to a desired length. The at least two dissimilar tire components are then transferred to the building drum.

16 Claims, 4 Drawing Sheets

COMBINED TRANSFER OF TOE GUARDS AND INNER LINER FROM FALSE DRUM TO BUILDING DRUM

TECHNICAL FIELD OF THE INVENTION

The invention relates to methods and apparatus used in the preparation of materials to be used in the fabrication of pneumatic tires. In particular the invention relates to the process of loading tire components onto a false drum, prior to their being transferred to a tire building drum.

BACKGROUND OF THE INVENTION

It is known that in making vehicle tires, for example for automobiles, that manufacture of a so-called carcass is first achieved by successively assembling several different components. In other words, the different carcass types included in a production range can be distinguished from one another depending on the presence thereon of the various accessory components and/or the typology of the accessory components themselves. By way of example, when carcasses for tubeless tires are to be produced, that is tires that in use do not require the presence of an inner tube, the main components can be considered to include a so-called inner liner that is a layer of elastomeric air-impervious material, a carcass ply, a pair of annular metal elements, commonly referred to as bead cores, around which the opposite ends of the carcass ply are folded, as well as a pair of sidewalls made of elastomeric material, extending over the carcass ply at laterally opposite positions. The accessory components may in turn comprise of one or more additional carcass plies, one or more reinforcing bands for overlying the carcass ply or plies at the areas turned up around the bead cores (chafer strips), and others.

A tire component of relevance to the present invention is the "toe guard". A toe guard is an elongate strip of material, typically fabric, which is disposed in the bead area of the tire, that extends circumferentially around the inner surface of the bead area, and which comprises that portion of the tire which is in contact with the wheel rim. There are therefore two toe guards, per tire.

It is well known that the components of most pneumatic tire constructions must be assembled in a way which promotes good tire uniformity in order to provide proper tire performance. For example, a tread which "snakes" as it goes around the tire circumference will cause wobbling as the tire is operated. For example, a carcass ply which is lopsided (longer cords on one side of the tire than the other side) can cause a variety of tire nonuniformity problems including static imbalance and radial force variations. For example, a tire which is not meridionally symmetric (e.g., tread not centered between beads) can cause a variety of tire nonuniformity problems including couple imbalance, lateral force variations, and conicity. Therefore, in order to meet typical tire performance requirements, the tire industry generally expends considerable effort in producing tires with good uniformity.

Tire uniformity is generally considered to mean tire dimensions and mass distributions which are uniform and symmetric radially, laterally, circumferentially, and meridionally, thereby producing acceptable results for measurements of tire uniformity including static and dynamic balance, and also including radial force variation, lateral force variation, and tangential force variation as measured on tire uniformity machines which run the tire under load on a road wheel. Although certain degrees of tire nonuniformity can be corrected in post-assembly manufacturing (e.g., by grinding), and/or in use (e.g., applying balance weights to the rim of a tire/wheel assembly), it is preferable (and generally more efficient) to build-in tire uniformity as much as possible.

Typical tire building machines comprise a building drum, which is generally cylindrical and which has a diameter approximately equal to the bead diameter of the tire being built, around which the tire components are wrapped in successive layers including, for example, an innerliner, toe guards, one or more carcass plies, optional sidewall stiffeners and bead area inserts (e.g., apex), sidewalls and bead wire rings (beads). After this layering, the carcass ply ends are wrapped around the beads, the tire carcass is blown up into a toroidal shape, and the tread/belt package is applied. Finally the tire is completed using conventional techniques.

Certain tire building assembly lines use servers of various kinds for the purpose of securely holding flat materials, such as the tire innerliner, while it is being cut to size. Servers are commonly of the flat conveyor type, such as the one shown in British Patent No. 1,010,597 (Dunlop Rubber Company) or the conveyor and cutting system shown in U.S. Pat. No. 4,722,255 (Choate, et al.), wherein a continuous flat sheet of material is delivered upon a flat conveyor to a cutting knife. After severing, the material is removed to be placed upon the tire being built. Another such conveyor system is taught in U.S. Pat. No. 5,820,726 (Yoshida, et al.), incorporating a "transfer drum" element which feeds material to the conveyor system.

Drum-type servers, or so called "false drum" servers, are an alternative conveyor of flat or sheet tire materials that must be held securely while being cut. After being cut, the sheet material is moved to the tire under construction on the building drum. Generally such a false drum server comprises a horizontally disposed drum or cylinder that is able to rotate about its cylindrical axis. One particular false drum type server consists of a circular cylindrical drum that is hollow. The surface of the drum is perforated around most of its circumference, and air is pumped out of the drum in sufficient volume that the low pressure within the drum provides a suction adhering surface which can securely hold the flat or sheet materials that are being cut while being held on the server. When a flat sheet of material, such as tire innerliner, is placed on the perforated cylindrical part of the server, the pressure differential between the inside of the drum and the outside causes the flat material to adhere to the drum surface while the material undergoes a cutting operation.

The suction adhering part of the perforated drum type false drum server is its perforated cylindrical drum surface. The false drum server is typically of a much larger diameter than that of the building drum. (However, its diameter should be no less than the building drum.) Tire components, such as sheet rubber components, are measured to a required length on the false drum server, and then are cut before being transferred to the building drum. The tire components that are placed on the false drum server are held to the false drum server because the pressure differential across the perforated cylindrical surface makes the cylindrical surface into a suction adhering surface.

Typically, a tire component is placed on the false drum, cut to length, then transferred to the building drum, then the next component is placed on the false drum, cut to length, then transferred to the building drum. This process is repeated, as may be required, until all the component of a green tire carcass have been laid up on the building drum.

When tire components are placed, in this manner, one at a time, from the false drum to the building drum, inaccuracies in the positions of the tire components can occur. And inaccuracies inevitably lead to non-uniformities in the final tire which, as discussed above, are undesirable.

Material is loaded onto the false drum, typically from roll stock, using a pickup unit. Any number of pickup units for picking up various tire components and placing them on the false drum are known. Two tire components of particular interest to the present invention are the inner liner and toe guards.

SUMMARY OF THE INVENTION

It is an object of the present invention to provide methods and apparatus as defined in one or more of the appended claims and, as such, having the capability of accomplishing one or more of the following subsidiary objects.

According to the invention, two dissimilar tire components (e.g., inner liner and toe guards) are placed on a false drum prior to transferring the components to a building drum. Then they are transferred together, en masse (combined), as a "subassembly" (or partial green tire carcass), to the building drum. The two dissimilar tire components preferably overlap one another, are "tacky" and stick to one another. For example, a one of the components is an inner liner, and the other component(s) is/are (e.g., fabric) toe guard(s). In this manner, the positioning of the toe guards, vis-a-vis the inner liner, can more accurately be controlled, thereby reducing one potential source of tire uniformity problems. The invention can be utilized in the context of any two tire components which can accurately be placed with respect to one another on the false drum, and transferred as a subassembly to the building drum.

In an embodiment of the invention, at least two dissimilar tire components are placed on a false drum, and are subsequently transferred, en masse, to the building drum, in the following manner. The first tire component is placed on the false drum with the false drum stationary, using a vacuum device to pick up a free end of the first tire component and place it on the false drum. The vacuum in the false drum is turned on to grasp the first tire component, and the vacuum device is turned off to release the first tire component. A free end of the second tire component is picked up using a pickup device, and is placed on the false drum. The step of placing the free end of the second tire component onto the false drum may be performed after the drum has been rotated slightly. The false drum is rotated to measure out the first and second tire components, and they are cut to a desired length. The at least two dissimilar tire components are then transferred to a building drum.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1A:
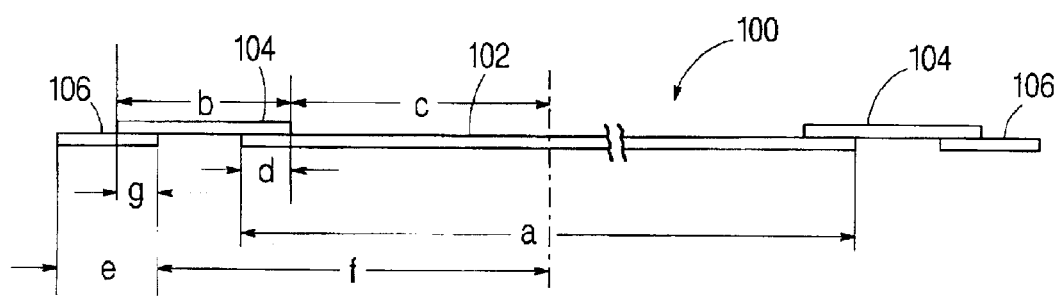
Figure 1B:
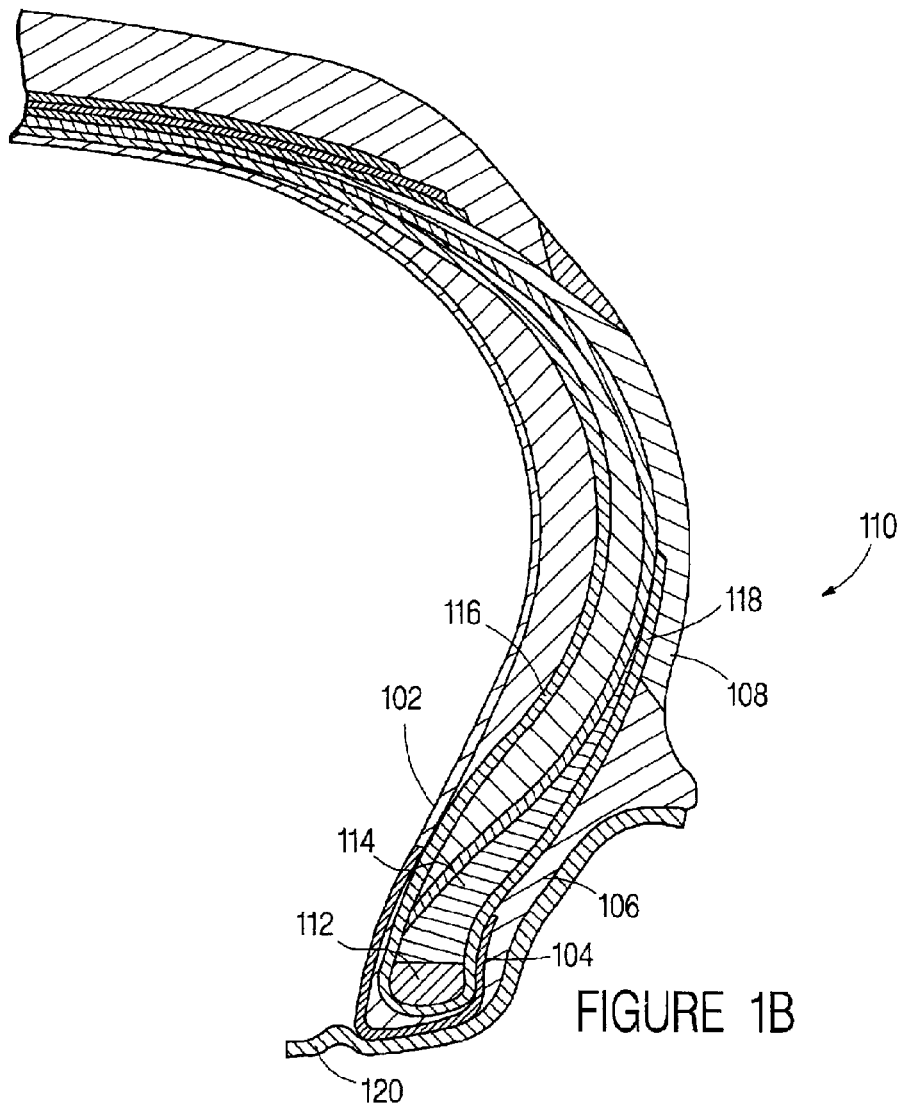
Figure 2A:
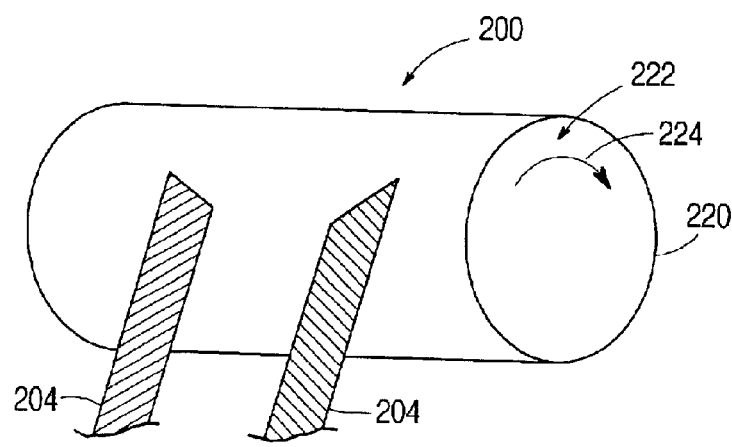
Figure 2B:
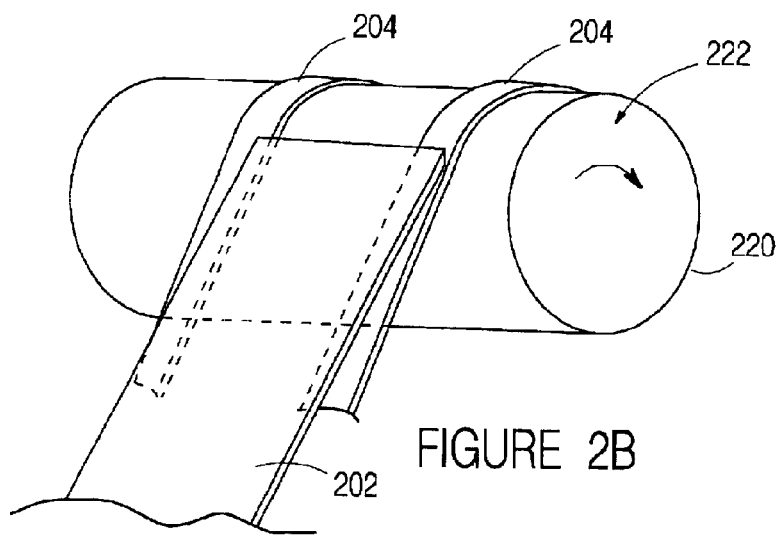
Figure 2C:
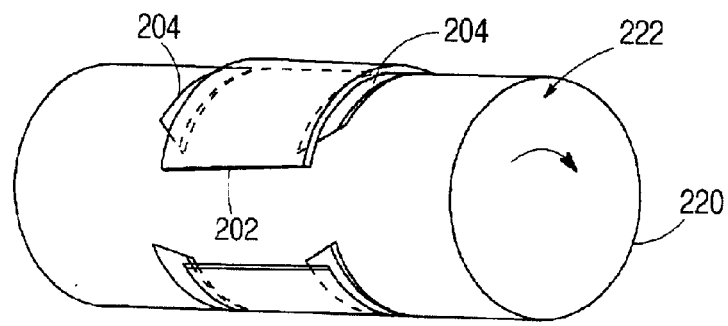
Figure 3A:
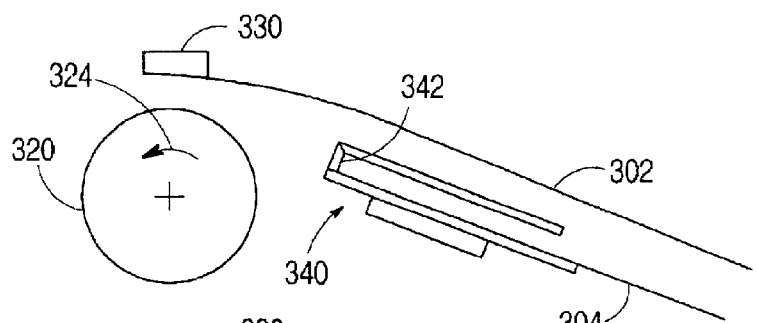
Figure 3B:
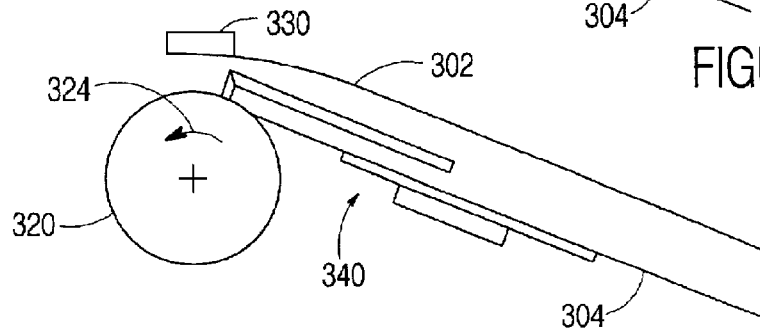
Figure 3C:
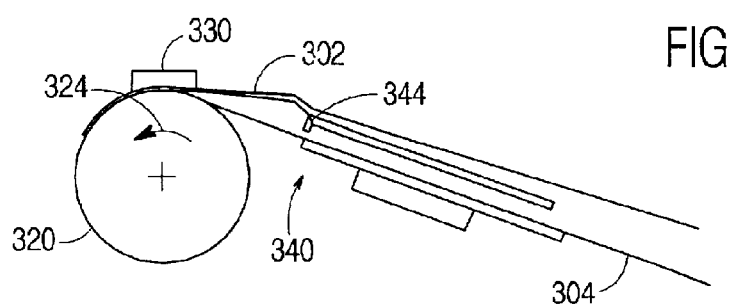
Figure 3D:
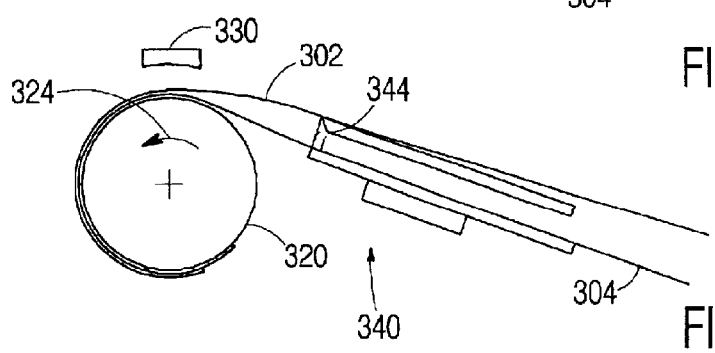
Figure 3E:
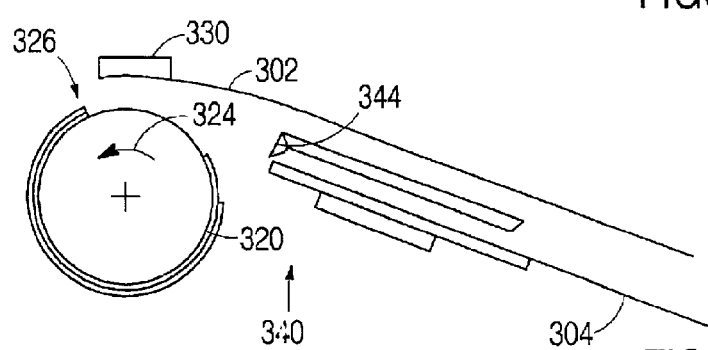
Figure 4:
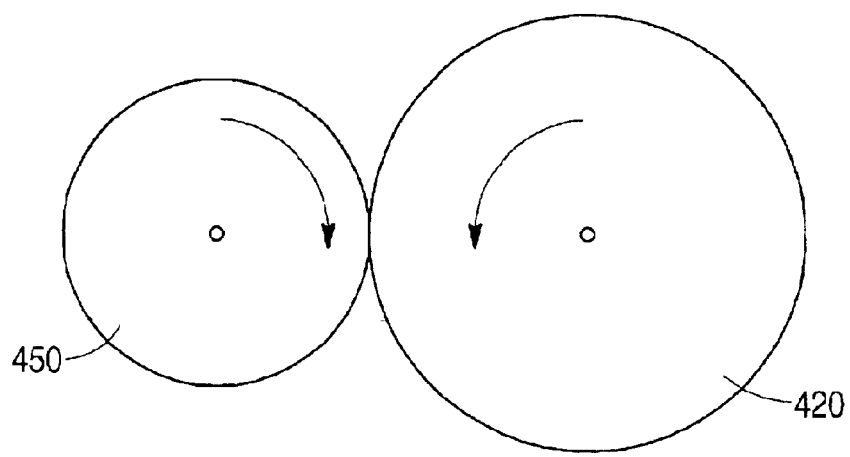

The structure, operation, and advantages of the present preferred embodiment of the invention will become further apparent upon consideration of the following description taken in conjunction with the accompanying drawings, wherein:

FIG. 1A is a schematic cross-sectional view of a partial layup of a tire carcass, showing the relationship between various tire components;

FIG. 1B is a cross-sectional view of a bead area of a finished tire, again showing the relationship between various tire components;

FIGS. 2A, 2B and 2C are schematic perspective illustrations of a process of placing tire components on a false drum, according to the invention;

FIGS. 3A, 3B, 3C, 3D and 3E are schematic side view illustrations of a process of placing tire components on a false drum, according to the invention; and FIG. 4 is a schematic side view of a false drum engaging a tire building drum during the process of transferring tire components to the tire building drum.

DETAILED DESCRIPTION OF THE INVENTION

FIG. 1A is a schematic cross-sectional view of a partial layup of a tire carcass 100, showing the relationship between two dissimilar tire components—namely, the tire inner liner 102 and two toe guards 104. Another tire component, two chafers 106 (typically extruded with the toe guards 104) are also shown in this view. This is representative of how the components would be laid up on a building drum (not shown). Typically the inner liner 102 is the first component to be laid upon the building drum followed, for example, by the chafers 106, then followed by the toe guards 104, followed by plies, apexes and beads. All this is well known.

FIG. 1B is a cross-sectional view of a bead area (regions) 110 of an exemplary finished tire and shows the aforementioned tire components in a tire which is mounted on a wheel rim 120. It should be understood that the present invention is not limited to the following exemplary tire construction, which is included only to facilitate an understanding of the invention. In FIG. 1B, the following components can be seen:

102 inner liner
104 toe guards
106 chafers
108 sidewall
112 bead
114 apex
116 ply (inner)
118 ply (outer)

As mentioned above, it is very important that the tire components be accurately placed on the building drum since inaccuracies in their placement will result in non-uniformities which adversely affect tire performance.

The present invention addresses the accurate placement of two dissimilar tire components, relative to one another, which will maximize their contribution to tire uniformity (minimize their impact on non-uniformity). When speaking of "two dissimilar tire components", it should be understood that two identical components are considered to be ("count as") only one dissimilar component. For example, two toe guards "count" as only one of two dissimilar tire components, and the inner liner counts as the other of the two dissimilar components.

The present invention is particularly useful in accurately locating two dissimilar tire components with respect to one another when the tire components are adjacent (overlapping) one another in the layup of the tire carcass, such as the aforementioned inner liner and toe guards. Or, the aforementioned toe guards and chafers. In the main, hereinafter, the accurate laying up of the two dissimilar tire components of inner liner and toe guards is discussed.

FIG. 1A illustrates the relative dimensions and positions of the two dissimilar tire components of inner liner 102 and toe guards 104. The inner liner 102 has an overall width dimension of "a", and is centered on what will be the equatorial plane ("EP") of the finished tire. All of the dimensions depend on the size of the tire being built. The two toe guards 104 each have a width dimension of "b". As used herein, the "width" dimension of a tire component is its dimension parallel to the axis of the building drum. The "length" dimension of a tire component, which will be discussed hereinbelow, is its dimension around the circumference of the building drum. It is assumed that the tire is meridionally symmetric.

The toe guards 104 are each offset from the EP by a distance "c". (Hence, they are spaced apart a distance 2c from one another). As illustrated, the toe guards 104 extend widthwise further than the inner liner 102, and inner (towards the EP) portions of the toe guards 104 overlap outer (away from the EP) portions of the inner liner 102 by a dimension "d". In this overlap region, the inner (bottom, as viewed) surface of a respective one of the toe guards 104 is in surface-to-surface overlapping contact with the outer (top, as viewed) surface of the inner liner 102. This is relevant in the discussion that follows—namely, that the two tire components that are being accurately laid up with respect to one another are in contact with one another—namely, at least partially overlapping.

As also shown in FIG. 1A, the two chafer components 106 each have a width of "e", and each are offset from the EP by a distance "f". As illustrated, outer portions of the toe guards 104 overlap inner portions of the chafers 106 by a dimension "g". In this overlap region, the inner (bottom, as viewed) surface of a respective one of the toe guards 104 is in surface-to-surface overlapping contact with the outer (top, as viewed) surface of the chafer 106. The toe guards 104 and chafers 106 are dissimilar tire components, and they are also at least partially overlapping. However, as mentioned before, the description of the present invention will primarily be directed to the dissimilar, overlapping tire components of inner liner and toe guard(s).

The dimensions, as shown in the drawings are merely exemplary to facilitate understanding the invention, and will vary from tire to tire, and may exceed the exemplary ranges set forth, either greater than or less than. This patent is not directed to tire dimensions, per se.

Measuring and Cutting Tire Components on the False Drum

False drums, and their role in the tire building process has been discussed hereinabove. Briefly, tire components are typically fed onto the false drum, which is typically large in dimension to the tire building drum, and the tire components are measured and cut on the false drum. Then, the tire components are transferred to the building drum. Tire components may be held onto the false drum by vacuum pressure. Tire component material is loaded onto the false drum, typically from roll stock, using pickup units which may employ vacuum to "grasp" free ends of tire component material (stock).

FIGS. 2A–2C illustrate a process 200 of placing two dissimilar tire components 204 onto a false drum 220. As mentioned above, a false drum 220 is generally a drum or cylinder that is able to rotate about its cylindrical axis. Typically, the surface of the false drum 220 is perforated (not shown) so that air pumped out of the drum will provide a suction for holding materials (i.e., tire components) which are place on the surface of the false drum. The false drum 220 may be provided with a cutter and/or a special cutting surface, all of which is known.

In FIG. 2A, the drum 220 is shown at an initial position, as indicated by the vertical position of the mark 222 on the visible end of the drum. (The mark 202 does not need to be on the drum 220 itself. It is included only for illustrative clarity.) Two toe guards 204 (compare 104) are shown being placed onto the false drum 220, with the drum in this initial position. The toe guards 204 are each elongate strips of material, having a width dimension b, and they are spaced apart a distance 2c from one another, as described hereinabove (refer to FIG. 1A). The front (leading) ends (edges) of the toe guards 204 are shown as being at approximately at what you could call the "11 o'clock" position of the drum 220 in its initial position.

Ultimately, as the false drum 220 rotates, in the direction of the arrow 224, the toe guards 204 will feed from their respective supply roll (or rolls), and will be cut to a predetermined length which is approximately one entire circumference of the building drum. (It is typical that tire components on the false drum span less than an entire circumference of the false drum since the false drum is typically larger in diameter than the building drum and, ultimately, the components span substantially exactly one circumference of the building drum.)

FIG. 2B shows the false drum 220 rotated slightly (e.g., 3 degrees), to a slightly advanced position. The inner liner 202 (compare 102) is placed on the false drum 220, with its front edge at what could be called "10 o'clock" position of the drum in its slightly advanced position. In this manner, the leading edge of the inner liner 202 is offset 6 degrees "behind" the front ends of the toe guards 204. (The actual degrees are not really that important. The point being made is that the leading edge of the inner liner 202 is circumferentially offset from the front ends of the toe guard strips 204.)

The false drum 220 then rotates further, again in the direction of the arrow 224, and when it has rotated a predetermined amount, the toe guards 204 are cut to length. Then, the drum is rotated again and the pick up pad 330, as described below, lowers to hold the end of the inner liner, which is then cut to length, resulting in a layup on the false drum as shown in FIG. 2C. As can best be seen in FIG. 2C, as placed on the false drum, the inner liner 202 is radially outside of the toe guards 204, which is the reverse order of how they should be laid up on the building drum (and of how they appear in the finished tire). One of ordinary skill in the art to which the present invention most nearly pertains will, of course, understand that when these two components are transferred from the false drum 220 to the building drum, the outside-inside order of components on the false drum will inherently be reversed to be an inside-outside order on the building drum—namely, with the toe guards 204 disposed on the outer surface of the inner liner 202, in the manner that was shown in FIG. 1A.

It is preferred, as described hereinabove, that the front/ leading ends/edge of the toe guards 204 and inner liner 202 be staggered (offset), circumferentially from one another. This is a well known procedure, and avoids having multiple splices (e.g., butt joints) at one circumferential position of the finished tire. Although this was illustrated as being the result of starting to place the inner liner 202 onto the false drum 220 after the toe guards 204 have been applied, and after the false drum has been rotated slightly. It is certainly within the scope of the present invention that both the toe guards and the inner liner can start to be fed onto the false drum at the substantially same time (i.e., substantially simultaneously), but preferably at circumferentially spaced apart positions (as illustrated). It is also within the scope of the invention that the front ends of the two toe guard strips are staggered, circumferentially, from one another.

It is also known to cut the ends of tire components at an angle (not parallel to the axis of the drum) so that a given butt joint is "spread out" over a range of circumferential positions. In this example, the toe guards 204 are shown having angled cuts at their ends. This is partially due to the fact that there is a weave to the fabric of the toe guard strip (e.g., 45 degree monofilament or woven material). It is also within the terms of the invention for the toeguard to be assembled from a woven material. This would also be the case, for example, with a ply which has cords disposed therein, at an angle. However, it should be understood that the present invention is not directed to the angle of the component ends, or the making of butt joints, per se. For example, the angle of the component ends could be as low as zero degrees.

The present invention comprises laying out (measuring and cutting) two dissimilar tire components (e.g., toe guards and inner liner) on a false drum, then transferring the two dissimilar tire components, as a "sub-assembly", en masse, onto the building drum. This can be done with tire components that do not overlap one another, or with tire components that do overlap one another. Most advantageously, this is done with tire components (e.g., toe guards and inner liner) that do overlap one another, and preferably with tire components which are tacky and stick to one another, so that the accurate dimensions (spacing, etc.) which are established on the false drum are readily transferred to the carcass being laid up on the building drum. This ensures accurate positioning and alignment which otherwise would be difficult to achieve by transferring the two tire components individually from the false drum to the building drum. The process is now described in somewhat greater detail.

FIGS. 3A–3E illustrate a process 300 of placing two dissimilar tire components onto a false drum 320, and is substantially similar to the process 200 described hereinabove. The process is described with respect to placing toe guards 304 (compare 204) and an inner liner 302 (compare 202) onto the false drum. In the views of FIGS. 3A–3E, the false drum 320 is rotated counter-clockwise, as indicated by the arrow 324.

FIGS. 3A–3E show a false drum 320 (compare 220) of a type such as is generally known in the art, which may have a perforated surface for holding tire components by suction on the outer surface thereof, and which may have a cutter mechanism 326 (FIG. 3E) associated therewith for cutting the material of tire components which have been measured out on the false drum.

FIGS. 3A–3E also show a pickup pad 330 of a mechanism for picking up a free end of a supply of inner liner material 302 (compare 202). The pickup pad 330 can be a suction device, such as is generally known in the art.

FIGS. 3A–3E also show a feed mechanism 340 for feeding strips of toe guard material 304 (compare 204) onto the false drum, and cutting the toe guard material. Such devices are generally known in the art, and generally include a suction device (cup) 342 and a cutter 344.

FIG. 3A shows a first step of the process. The false drum 320 is stationary, and in a "retracted" position (away from the building drum 350), and directly under the pick up pad 330 of the inner liner feeding mechanism. The pick up pad 330 is activated (e.g. vacuum "on") and the free (feed) end of the inner liner 302 is secured to the underside of the pick up pad. Also, the toe guard suction cup 342 is turned-on/activated (e.g., vacuum "on"), then lowered to grab the free (feed) end of the toe guard material 304 (both of the strips, of course). Then the toe guard suction cup 342 is raised. (It should be understood that this process is being done for both of the two toe guards.)

FIG. 3B shows a next step of the process. The toe guard feed mechanism 340 is advanced to the false drum 320 and the suction cup 342 is lowered so that the free end of the toe guard 304 contacts the surface of the false drum. The suction in the false drum 320 is turned on to grasp the toe guard 304, and the suction in the toe guard suction cup 342 is turned off to release the toe guard. Then the suction cup 342 is raised, out of the way, and the toe guard feed mechanism 340 is retracted away from the false drum 320. (This is done for both of the two strips of toe guard material, substantially simultaneously.) The toe guards 304 are thus secured to the false drum 320 for feeding, measuring and cutting.

FIG. 3C shows a next step of the process. The false drum 320 is rotated slightly (e.g., 5 degrees–30 degrees), then stopped. The vacuum in the false drum 320 remains "on". The inner liner pickup pad 330 lowers so that the free end of the inner liner 302 contacts the surface of the false drum 320. The suction in the false drum 320 is still "on" so it grasps the inner liner 302, and the suction in the inner liner pickup pad 330 is turned off to release the inner liner. Then the inner liner pickup pad 330 is raised, out of the way. The leading end of the inner liner 302 is thus secured to the false drum 320 for feeding, measuring and cutting.

FIG. 3D shows a next step of the process. The false drum 320 is rotated to measure out a length of toe guard material 304 and inner liner 302 equal to the circumference of the building drum 450, in length. The toe guard cutter 344 is operated to cut the toe guard material (preferably with the false drum stopped). Then, the false drum 320 is again rotated slightly (e.g., 5 degrees–30 degrees), then stopped. This slight rotation of the false drum 320 "takes up" the free trailing ends of the toe guard strips 304 onto the false drum. Note that the tacky inner liner material sticks to the tacky toe guard material.

FIG. 3E shows a next step of the process. The pickup pad 330 lowers onto the inner liner 302 and the vacuum in the pickup pad is turned on. The cutter 326 operates and cuts inner liner 302. Then, the pickup pad 330 raises with the new leading end of the inner liner 302.

FIG. 4 shows a final step of the process. The false drum 420 (compare drum 320) rotates to a further position, and advances to the building drum 450. Both, with controlled variation, the false drum 420 and the building drum 450, rotate to transfer the inner liner 302 and toe guards 304, en masse, together (combined) with one another, as an interim assembly (sub-assembly), from the false drum onto the building drum. In doing so, the toe guards, which were on the inside surface of the inner liner on the false drum 420 will end up on the outer surface of the inner liner on the building drum 450, in the manner shown in FIG. 1A. The result is a combined inner liner and toe guard application.

An advantage of the invention is that it is relatively straightforward to accurately place tire components on the false drum. During the process of transferring tire components from a false drum to a building drum introduces an opportunity for error (e.g., slight misalignment). The invention overcomes this problem by establishing accurate positional relationships between at least two dissimilar tire components. Although described mainly with respect to the toe guards and the inner liner, additional components (e.g., chafers 106) could be included in the subassembly which is placed on the false drum.

Preferably, there is some overlap between the tire components which are placed on the false drum. However, this is not absolutely necessary. With overlap, the tackiness of the green tire components will cause them to stick together and help ensure that they maintain their positional relationships with respect to one another during the process of combined transfer to the building drum. Without overlap, there is at least established accurate positional relationships between whatever dissimilar tire components are being placed on the false drum, prior to combined transfer to the building drum. In some cases, it may be desirable to introduce an additional tire component, such as a very thin rubber sheet, to link together tire components which do not overlap one another (i.e., bridging the gap between the tire components). In any of these cases, tire components are accurately and speedily applied, with precision joints.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. Method of building a tire, comprising the steps of:
   placing tire components on a false drum which is a cylindrical drum having a surface; transferring the tire components to a building drum;
   placing a first of at least two dissimilar tire components on the false drum;
   placing a second of at least two dissimilar tire components on the false drum;
   after placing the first and second tire components on the false drum, transferring the first and second tire components, en masse, to the building drum;
   selecting a toe guard for the first tire component;
   selecting an inner liner for the second tire component; and
   overlapping the first and second tire components with one another.

2. Method, according to claim 1, characterized by the steps of:
   circumferentially offsetting a leading edge of the first tire component from a leading edge of the second tire component; and
   sticking the at least two dissimilar tire components together.

3. Method, according to claim 1, characterized by the step of:
   placing the first tire component on the false drum with the false drum being stationary.

4. Method, according to claim 3, characterized by the step of:
   using a vacuum device to pick up a free end of the first tire component and place it on the false drum.

5. Method, according to claim 4, characterized by the step of:
   turning on a vacuum in the false drum to grasp the first tire component, then turning off the vacuum in the vacuum device to release the first tire component.

6. Method, according to claim 5, characterized by the step of:
   with a pickup device, placing a free end of the second tire component onto the false drum, then releasing the second tire component from the pickup device, the second tire component being secured to the false drum.

7. Method, according to claim 6, characterized by the step of:
   performing the step of placing the free end of the second tire component onto the false drum after the false drum has been rotated slightly.

8. Method, according to claim 6, characterized by the steps of:
   rotating the false drum to measure out the first and second tire components; and cutting the first and second tire components to a desired length.

9. Method according to claim 8, characterized in that:
   the first tire component is cut prior to the second tire component.

10. Method according to claim 9, characterized by the step of:
    with the pick up device picking up a free end of the second tire component from the false drum.

11. Method of building a tire, comprising the steps of:
    placing tire components on a false drum which is a cylindrical drum having a surface;
    transferring the tire components to a building drum;
    placing a first of at least two dissimilar tire components on the false drum;
    placing a second of at least two dissimilar tire components on the false drum;
    cutting the first tire component in a feed mechanism away from the false drum;
    after cutting the first tire component, cutting the second tire component on the false drum;
    after placing the first and second tire components on the false drum, transferring the first and second tire components, en masse, to the building drum;
    wherein the steps include:
    selecting a toe guard far the first tire component;
    selecting an inner liner as the second tire component; and
    overlapping the first and second tire components with one another.

12. Method according to claim 11, characterized by the step of:
    using a cutter associated with a pick up device for cutting the second tire component on the false drum, followed by picking up a free end of a supply of the second tire component.

13. Method, according to claim 13, characterized by the steps of:
    circumferentially offsetting a leading edge of the first tire component from a leading edge of the second tire component; and
    sticking the at least two dissimilar tire components together.

14. Method, according to claim 11, characterized by the steps of:
- placing the first tire component on the false drum with the false drum being stationary;
- using a vacuum device to pick up a free end of the first tire component and place it on the false drum;
- turning on a vacuum in the false drum to grasp the first tire component, then turning off the vacuum in the vacuum device to release the first tire component; and
- with a pickup device, placing a free end of the second tire component onto the false drum, then releasing the second tire component from the pickup device, the second tire component being secured to the false drum.

15. Method, according to claim 14, characterized by the step of:
- performing the step of placing the free end of the second tire component onto the false drum after the false drum has been rotated slightly.

16. Method, according to claim 14, characterized by the steps of:
- rotating the false drum to measure out the first and second tire components; and
- cutting the first and second tire components to a desired length.

* * * * *